United States Patent
Mathew et al.

(10) Patent No.: US 7,336,699 B2
(45) Date of Patent: Feb. 26, 2008

(54) METHOD AND APPARATUS FOR CODE IDENTIFICATION IN WIRELESS APPLICATIONS

(75) Inventors: Deepak Mathew, North Billerica, MA (US); Aiguo Yan, North Andover, MA (US); Zoran Zvonar, Boston, MA (US); Abhay Sharma, Wakefield, MA (US)

(73) Assignee: Analog Devices, Inc., Norwood, MA (US)

( * ) Notice: Subject to any disclaimer, the term of this patent is extended or adjusted under 35 U.S.C. 154(b) by 904 days.

(21) Appl. No.: 10/368,847

(22) Filed: Feb. 19, 2003

(65) Prior Publication Data

US 2004/0161020 A1    Aug. 19, 2004

(51) Int. Cl.
*H04B 1/69* (2006.01)
*H04B 1/707* (2006.01)
*H04B 1/713* (2006.01)

(52) U.S. Cl. ............... 375/149; 375/142; 375/150; 375/343; 370/320; 370/335

(58) Field of Classification Search ............. 375/142, 375/150, 343, 149; 370/320, 335
See application file for complete search history.

(56) References Cited

U.S. PATENT DOCUMENTS

| | | | | |
|---|---|---|---|---|
| 5,982,763 | A * | 11/1999 | Sato | 370/342 |
| 6,363,060 | B1 * | 3/2002 | Sarkar | 370/342 |
| 6,765,531 | B2 * | 7/2004 | Anderson | 342/378 |
| 6,965,586 | B1 * | 11/2005 | Maruyama | 370/335 |
| 7,095,811 | B1 * | 8/2006 | Shikh-Bahaei et al. | 375/340 |

\* cited by examiner

*Primary Examiner*—David C. Payne
*Assistant Examiner*—Erin M. File
(74) *Attorney, Agent, or Firm*—Wolf, Greenfield & Sacks, P.C.

(57) ABSTRACT

A system and method are provided for determining whether a chipping code from a group of codes is used in a signal. In one embodiment of the invention, a signal is received and each code from the group is correlated with the received signal. The ratio of the highest correlation value to the second highest correlation value is calculated. If the ratio exceeds a threshold, the chipping code may be determined as the chipping code used in the signal. In another embodiment, the ratio of the highest correlation value and the total received power of the signal is calculated. If the ratio exceeds a threshold, the chipping code may be determined as the chipping code used in the signal.

29 Claims, 9 Drawing Sheets

FIG. 5A

Pipelined Cell Search

| Stage 1 | Stage 1 | Stage 1 | Stage 1 | Stage 1 |
| Stage 2 | Stage 2 | Stage 2 | Stage 2 | |
| Stage 3 | Stage 3 | Stage 3 | | |

Sequential Cell Growth

| Stage 1 | Stage 2 | Stage 3 | Stage 1 | Stage 2 | Stage 3 |

551, 553, 555, 557

METHOD AND APPARATUS FOR CODE IDENTIFICATION IN WIRELESS APPLICATIONS

FIELD OF THE INVENTION

The present invention is directed to wireless systems and, more particularly to code identification in such wireless systems.

BACKGROUND OF INVENTION

Code-division multiple access (CDMA) is a spread spectrum technology for sharing resources in a cellular telephone system. Within a given cell, multiple users usually share the frequency spectrum. One method of sharing the spectrum is division by frequency, in which the frequency spectrum is divided into multiple frequency channels and each mobile station is allocated a frequency channel to communicate with the base station of the cell. This method is known as frequency division multiple access (FDMA). In another method known as time-division multiple access (TDMA), multiple mobile units share a frequency channel but use it at different period of time. Such a method is illustrated in FIG. 1. As shown in FIG. 1, mobile unit one is permitted to communicate with the base station during time periods A and D. Mobile unit two is permitted to communicate with the base station during time period B and mobile unit three is permitted to communicate with the base station during time period C. In this manner, multiple mobile units in the same cell can share the same frequency channel, without interfering with each other's signals.

Unlike FDMA and TDMA, CDMA allows every mobile unit to communicate with the base station using same frequency channel at the same time. CDMA uses a direct sequence spread spectrum technique, in which the baseband information signal is modulated using a code, known as a chipping code, which has a much higher chip rate than symbol rate of the baseband information signal. The result is that the modulated signal is spread over a wider frequency spectrum. In a CDMA cellular system, each mobile unit uses a different set of chipping codes to communicate with the base station. The chipping codes are chosen so that they have low cross-correlation with each other. That is, the chipping codes are designed for maximum separation from each other. The base station can identify each transmitting mobile unit based on the chipping code used in the transmission. However, with the widespread use and popularity of mobile phones, it has become increasingly desirable to provide mobile phones with high speed internet access, data, video and music services. High data transfer speeds are required to provide such services. Thus, third generation (3G) networks have been developed which are based on a high speed version of CDMA known as wide band CDMA (WCDMA), which uses a wider frequency spectrum than CDMA, thus providing more bandwidth for data transfer.

SUMMARY OF THE INVENTION

According to one aspect of the invention, a method is provided for determining a correct code from a group of codes. The method comprises acts of a) receiving a signal which includes the correct code, b) calculating, for each respective code in the group of codes, a correlation value of the received signal and the respective code, c) comparing, responsive to the act b) of calculating, a highest correlation value and a next highest correlation value, and d) determining if the comparison of act c) exceeds a first threshold. In one embodiment of the invention, the method further comprises: e) comparing the highest correlation value and a total received power of the signal, and f) determining if the comparison of act e) exceeds a second threshold. In one embodiment of the invention, a method is provided wherein the act e) further comprises: dividing the highest correlation value by the total received power of the signal. According to another aspect of the invention, the method further comprises: g) determining if the code with the highest correlation value is the correct code based on the acts d) and f). According to another aspect of the invention, the method further comprises determining if the code with the highest correlation value is the correct code based on the act d). In one embodiment, a method is provided wherein the act c) further comprises dividing the highest correlation value by the next highest correlation value to produce a comparison value.

According to another aspect of the invention, the method further comprises selecting the code with the highest correlation value as the correct code if the comparison value exceeds the first threshold. According to another aspect of the invention, the method further comprises repeating acts a)-d) if the comparison value is less than a third threshold.

According to one aspect of the invention, an apparatus is provided for determining a correct chipping code from a group of chipping codes in a communications system. The apparatus comprising a) means for receiving a signal which includes the correct chipping code, b) means for calculating, for each respective chipping code in the group of chipping codes, a correlation value of the received signal and the respective chipping code, c) means for comparing, responsive to the act b) of calculating, a highest correlation value and a next highest correlation value, and d) means for determining if the comparison of act c) exceeds a first threshold.

According to one aspect of the invention, the apparatus further comprises e) means for comparing the highest correlation value and a total received power of the signal, and f) means for determining if the comparison of act e) exceeds a second threshold. According to one aspect of the invention, the apparatus further comprises g) means for determining if the chipping code with the highest correlation value is the correct chipping code based on the acts d) and f). According to one aspect of the invention, the apparatus further comprises means for determining if the chipping code with the highest correlation value is the correct chipping code based on the act d).

According to one aspect of the invention a method is provided for selecting a chipping code from a group of chipping codes in a wireless communications network having a base station which broadcasts data to a plurality of mobile stations according to a corresponding chipping code, the base station using its chipping code to divide the data before transmission. The method comprises a wireless communications network having a base station which broadcasts data to a plurality of mobile stations according to a corresponding chipping code belonging to a group of chipping codes, the base station using its corresponding chipping code to divide the data before transmission, a method of selecting the corresponding chipping code from the group of chipping codes: a) transmitting a signal which includes the corresponding chipping code from the base station to a mobile station, b) using the mobile station to calculate, for each respective chipping code in the group of chipping codes, a correlation value of the signal and the respective chipping code, c) using the mobile station to compare, responsive to the act b), a highest correlation value and a next highest correlation value, and d) using the mobile station to determine if the comparison of act c) exceeds a first threshold.

According to another aspect of the invention the method further comprises e) using the mobile station to compare the highest correlation value and a total received power of the signal, and f) using the mobile station to determine if the comparison of act e) exceeds a second threshold. In one embodiment of the invention, a method is provided wherein the act e) further comprises using the mobile station to divide the highest correlation value by the total received power of the signal. According to another aspect of the invention, the method further comprises g) using the mobile station to determine if the chipping code with the highest correlation value is the correct chipping code based on the acts d) and f). According to another aspect of the invention, the method further comprises using the mobile station to determine if the chipping code with the highest correlation value is the correct chipping code based on the act d). According to another aspect of the invention, the method further comprises repeating acts a)-d) if the comparison value is less than a third threshold.

According to one aspect of the invention, a method is provided for selecting a correct chipping code from a group of chipping codes in a wireless communications network having a base station which broadcasts data to a plurality of mobile stations according to a corresponding chipping code belonging to a group of chipping codes, the base station using its corresponding chipping code to divide the data before transmission. The method comprises a) transmitting a signal which includes the corresponding chipping code from the base station to a mobile station, b) using the mobile station to calculate, for each respective chipping code in the group of chipping codes, a correlation value of the signal and the respective chipping code, c) using the mobile station to compare, responsive to the act b), a highest correlation value and a total received power of the signal, and d) using the mobile station to determine if the comparison of act c) exceeds a first threshold.

According to one aspect of the invention, the method further comprises e) using the mobile station to compare the highest correlation value and a next highest correlation value, and f) using the mobile station to determine if the comparison of act e) exceeds a second threshold. In one embodiment of the invention, a method is provided wherein the act e) further comprises using the mobile station to divide the highest correlation value by the next highest correlation value. According to one aspect of the invention, the method further comprises g) using the mobile station to determine if the chipping code with the highest correlation value is the correct chipping code based on the acts d) and f). According to another aspect of the invention, the method further comprises using the mobile station to determine if the chipping code with the highest correlation value is the correct chipping code based on the act d).

In one embodiment of the invention, a method is provided wherein the act c) further comprises using the mobile station to divide the highest correlation value by the total received power of the signal to produce a comparison value. According to another aspect of the invention, the method further comprises using the mobile station to select the chipping code with the highest correlation value as the correct chipping code if the comparison value exceeds the first threshold.

According to one aspect of the invention, a method is provided for selecting a correct chipping code from a group of chipping codes in a wireless communications network having a base station which broadcasts data to a plurality of mobile stations according to a corresponding chipping code belonging to a group of chipping codes, the base station using its corresponding chipping code to divide the data before transmission, the base station broadcasting the chipping code in a radio frame having a plurality of slots. The method comprises a) using the mobile station to determine a slot timing a radio frame used in transmissions by the base station by determining a timing of a first signal broadcast at the beginning of each slot in the radio frame by the base station on a primary synchronization channel, b) using the mobile station to determine a frame timing of a radio frame used in transmissions by the base station by determining a pattern of second signals broadcast by the base station at the beginning of each slot of the radio frame on a secondary synchronization channel, c) determining the group of chipping codes based on the pattern, d) transmitting a third signal from the base station to a mobile station according to the frame timing determined in act b), e) using the mobile station to calculate, for each respective chipping code in the determined group of chipping codes, a correlation value of the signal and the respective chipping code, t) using the mobile station to compare, responsive to the act e), a highest correlation value and a next highest correlation value, and g) using the mobile phone to determine if the comparison of act f) exceeds a first threshold.

In yet another aspect of the invention a method of determining whether a chipping code from a group of codes is used in a signal is provided. The method comprises acts of a) determining correlation values of known codes, b) predicting a correlation value for the chipping code, based on the correlation values of the codes of the transmitter and power offsets among the codes, c) deriving a threshold from the predicted correlation value and d) comparing the highest correlation value using the threshold.

BRIEF DESCRIPTION OF THE DRAWINGS

FIG. 5A is an example of pipelined cell search according to one embodiment of the invention;

FIG. 5B is a diagram illustrating sequential cell search according to one embodiment of the invention;

DETAILED DESCRIPTION

Figure 1:
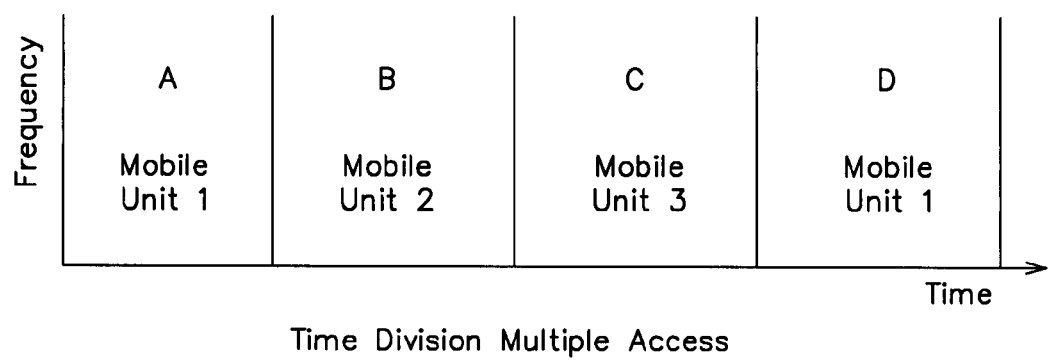
FIG. 1 is a diagram illustrating a time division multiple access scheme for wireless communication.

Wireless communication systems often use special codes for information exchange and other purposes. These codes may be, for example, spreading codes used to spread a signal across the frequency spectrum in a direct sequence spread spectrum (DSSS) wireless system, such as a CDMA system or a WCDMA system. The codes may also be, for example, codes which define a sequence of carrier frequency shifting in a frequency hopping spread spectrum (FHSS) system or encryption codes or spreading codes used in a wireless local area network (LAN) or wide area network (WAN), such as an 802.11 or WiFi wireless network.

The CDMA based spread spectrum cellular system uses different chipping codes to distinguish signal from different base stations which transmit signals at the same frequency and at the same time. The mobile communicator may first achieve timing synchronization with the base station and identify the chipping code used by the base station before data can be exchanged. The signal received by a communicator is often a composition of signals from several neighboring base stations, and is often corrupted by propagation channels, noise, and interference. Therefore, finding the chipping code and achieving time synchronization in a communicator may often be a non-trivial task.

The mobile communicator may have some information about the chipping codes used by the base station transmitter. That is, the mobile communicator may store a set of possible chipping codes that a base station may use. The signal received by the communicator may include a specific chipping code. To identify that specific chipping code, the received signal may be correlated with each chipping code from the set of possible codes. The code that results in highest correlation above a certain threshold may be assumed as the code used by the base station. If none of correlations are above the threshold, reliable identification of the codes used by base stations may not be possible. Alternatively, each code may be correlated with the received signal sequentially until a code is found whose correlation value exceeds a threshold. This code may then be assumed to be the code used by the base station. However, the selection of a threshold may often be difficult because the value of correlations may vary depending upon the power of the received signal. Selection of a threshold may be difficult for other reasons, such as losing correct timing due to timing-drift, which may be caused by, for example, crystal inaccuracy. Other errors in the transmission, reception, or correlation process could result in a relatively high correlation value when a low correlation value is expected. As a result, the chipping code may be identified incorrectly. The mobile communicator may consume much time and power before it identifies the error condition caused by the incorrect identification of the chipping code.

Another disadvantage is that correlation values may vary depending on the power of the received signal. Thus, correlation values for each of the codes may be lower when the communicator is in an obstructed area such as behind large mountains or tall buildings. Thus, when using a threshold, if a high threshold is chosen, none of the codes may have a correlation value high enough to exceed the threshold when in an obstructed area. Conversely, if a low threshold is chosen, many or all of the codes may have a correlation value, which exceeds the threshold. Such errors may result in wasted time and power when it becomes necessary to repeat the code determination process.

In another method, each code is correlated with the received signal as described above, and a correlation value is calculated for each code. Then, the ratio of the highest correlation value to the second highest correlation value is calculated. Because codes in a group can be chosen to have low cross-correlation with each other and low auto correlation properties with time shifted versions of themselves, it can be expected that if the received signal is synchronized in time with the correct code, then the correlation value of the correct code with the received signal will be high, while the correlation values of the rest of the codes with the received signal will be low. In this situation, one code in the group should have a much higher correlation value than the rest of the codes in the group. As a result, the ratio of the highest correlation value to the second highest correlation value should be much greater than one.

However, if an error occurred in transmitting, receiving, or synchronizing the code to the received signal, then the correlation values of all the codes may be expected to be very low and close to each other. In this situation, the ratio of the highest correlation value to the second highest correlation value will be closer to 1. Thus, a threshold may be chosen, and if the ratio exceeds the threshold, the code with the highest correlation value may be chosen as the correct code. If the ratio does not exceed the threshold, all of the codes can be rejected and the process repeated.

Such a method has the advantage of reducing the likelihood that a wrong code may be selected. As a result, it is less likely that a communicator will try to communicate with the wrong code. Because a communicator is less likely to communicate with a wrong code before it realizes that it is the wrong code time and power savings can be achieved. Moreover, because this method uses a ratio of correlation values, the threshold may be chosen independent of the power of the signal.

Figure 2:
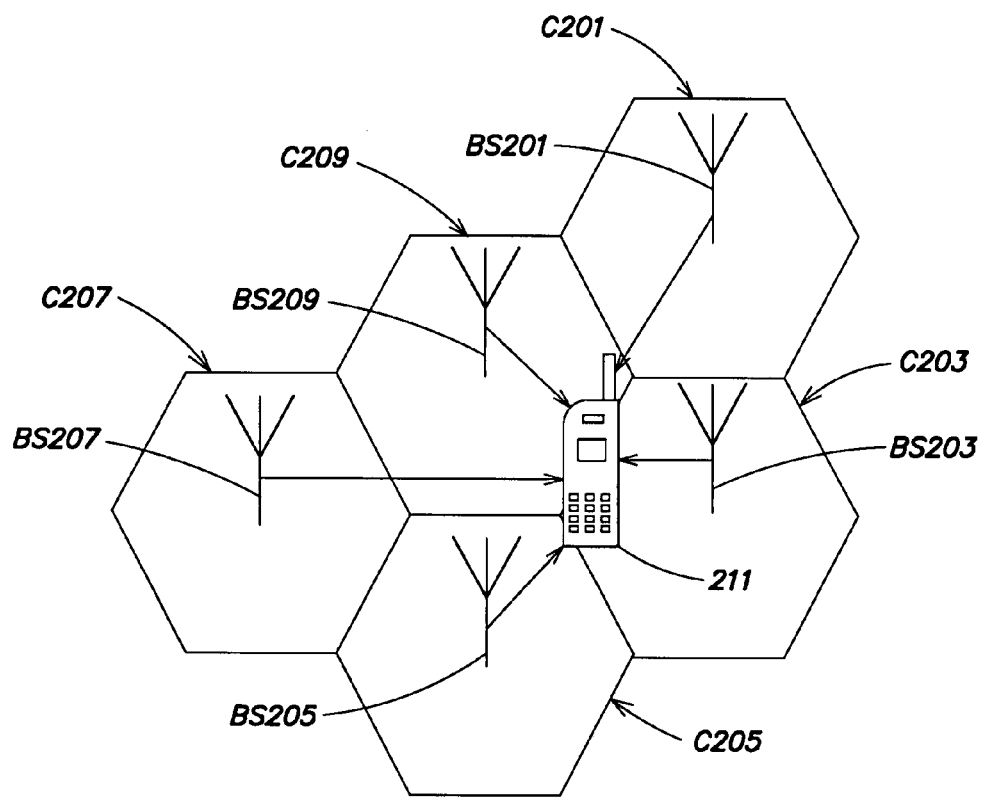
FIG. 2 is a diagram of a typical cellular communications system according to one embodiment of the invention.

One embodiment of the invention will be described in relation to WCDMA cellular systems. However, it should be understood that the invention could be used in many different wireless systems and the system described below is given only as an example. Moreover, the terms "comprising", "including", and "having", as used herein are intended to be synonymous and open-ended, that is, including but not limited to. When a mobile station is turned on or is moved between cells, the mobile station must locate a base station in its current cell with which to communicate. FIG. 2 shows a mobile station 211 in a cellular system which includes cells C201, C203, C205, C207, and C209, each having a respective base station, BS201, BS203, BS205, BS207, and BS209. Mobile station 211 may receive signals from many base stations in different cells, but should determine which base station is transmitting the strongest signal. The mobile station should also identify the base station with the strongest signal so that it can receive information broadcast by that particular base station and set up communication channels with the base station.

Figure 3:
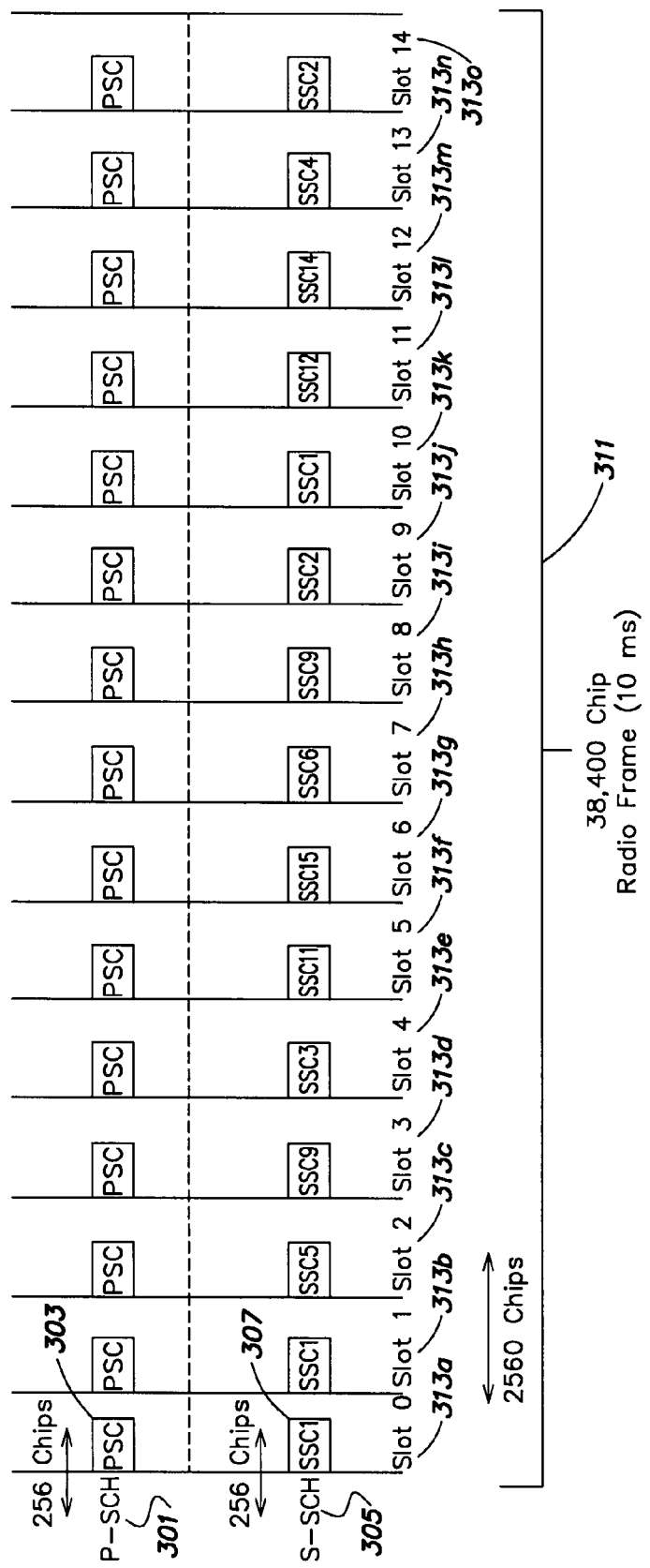
FIG. 3 is an example of a WCDMA radio frame according to one embodiment of the invention.

The process of identifying a base station is known as cell search. In WCDMA systems, each base station can be identified by one of five hundred twelve primary scrambling codes. In every cluster of cells, each base station has a unique scrambling code. The scrambling code is a special chipping code that is used to spread broadcast channels and other channels transmitted by the base station, so the mobile station must identify which scrambling code the base station is using in order to demodulate the broadcast channels. Often, it is desirable to complete the process of cell search as quickly as possible. Rapid completion of cell search allows for faster availability of the mobile station for use by a user. Second, because cell search can be a processor intensive and computationally complex operation, fast completion of cell search can reduce the operation time of the processor, saving power and extending battery life. Before a mobile station can determine the scrambling code it must synchronize in time with the base station. In WCDMA systems, the time axis is divided into radio frames each having a duration of ten milliseconds, as shown in FIG. 3. Each radio frame 311 is further divided into fifteen slots, 313a-313o. The cell search process in WCDMA includes three stages. Stage one includes achieving slot synchronization with the base station, stage two includes achieving frame synchronization with the base station and identifying the scrambling code group of the base station's scrambling code, and stage three includes identifying the scrambling code of the base station. Special channels are typically provided to aid in the cell search process. The primary synchronization channel (P-SCH) is used to identify slot boundaries in a radio frame. The secondary synchronization channel (S-SCH) is used to identify the frame boundary and the scrambling code group. The common pilot channel (CPICH) is used to identify the scrambling code from the scrambling code group.

As discussed above, there are 512 primary scrambling codes that a base station may use. These 512 scrambling codes are divided into sixty-four groups of eight scrambling codes in each group. Referring to FIG. 3, the P-SCH 301 is used to determine slot boundaries. The base station broadcasts a primary synchronization code (PSC) at the beginning of each slot in every radio frame, e.g., PSC 303. The PSC is the same in every slot and in every cell. A ten millisecond radio frame consists of 38,400 chips (e.g., using a chip rate of 3.84 Mchips per second). Each radio frame is divided into fifteen slots, each slot being 2,560 chips. The P-SCH is only active during the first 256 chips of each slot, thus having a duty cycle of ten percent. To determine the slot boundary, a mobile station can perform a hypothesis test on all the possible 2,560 locations of the PSC, as shown in Table 1. That is, the received signal is correlated with the PSC at 2,560 location. The strongest correlation peak above a threshold, $\tau_1$, may be chosen as the PSC location.

TABLE 1

$$R_u^j = \left| \sum_{k=0}^{255} x_{k+u}^j c_k^0 \right|^2 > \tau_1, u = 0, 1, \ldots, 2559$$

$x_k^j = k^{th}$ sample of the $j^{th}$ slot $c_k^o =$ is the $k^{th}$ sample of the PSC Once the slot timing of the base station is determined, the frame timing of the base station and the scrambling code group used by the base station can be determined using S-SCH 305. Secondary synchronization codes are broadcast over the S-SCH. Like the P-SCH, the S-SCH is also active only during the first 256 chips of each slot. However, instead of using the same code in every slot, the S-SCH broadcasts one of sixteen secondary synchronization codes (SSCs) at the beginning of each slot, e.g., SSC 1307. The sequence of SSCs broadcast by the base station is used to determine the scrambling code group of the base station. Table 2 shows the sequences of secondary synchronization codes for seven of the sixty-four scrambling code groups. Each sequence consists of fifteen of the sixteen secondary synchronization codes. Each sequence of SSCs corresponds to a scrambling code group.

TABLE 2

| SCRAMBLING CODE GROUP | SLOT NUMBER | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 0 | 1 | 1 | 2 | 8 | 9 | 10 | 15 | 8 | 10 | 16 | 2 | 7 | 15 | 7 | 16 |
| 1 | 1 | 1 | 5 | 16 | 7 | 3 | 14 | 16 | 3 | 10 | 5 | 12 | 14 | 12 | 10 |
| 2 | 1 | 2 | 1 | 15 | 5 | 5 | 12 | 16 | 6 | 11 | 2 | 16 | 11 | 15 | 12 |
| 3 | 1 | 2 | 3 | 1 | 8 | 6 | 5 | 2 | 5 | 8 | 4 | 4 | 6 | 3 | 7 |
| 4 | 1 | 2 | 16 | 6 | 6 | 11 | 15 | 5 | 12 | 1 | 15 | 12 | 16 | 11 | 2 |
| 5 | 1 | 3 | 4 | 7 | 4 | 1 | 5 | 5 | 3 | 6 | 2 | 8 | 7 | 6 | 8 |
| 6 | 1 | 4 | 11 | 3 | 4 | 10 | 9 | 2 | 11 | 2 | 10 | 12 | 12 | 9 | 3 |

The same sequence of SSCs is repeated in every frame of a given cell. Each of the sixty-four SSC sequences corresponds to one of the sixty-four scrambling code groups. The sixty-four SSC sequences are chosen such that their cyclic shifts are unique. To determine frame timing each of the sixteen SSCs are correlated at fifteen consecutive slot boundaries. Based upon these correlations, the code group and the frame offset may be determined. An example algorithm, known as non-coherent detection, for SSC detection is shown in Table 3. However, it should be understood that this algorithm is given only as an example, and any other suitable algorithm may be used.

As shown in Table 3, step 1 involves calculating the S-SCH correlation for each slot with each of the sixteen SSCs. The result is a fifteen by sixteen matrix. In step two of the algorithm, the decision variable, $D_y^x$, is calculated. The third step involves determining the [x, y] which maximizes the decision variable, where x is the scrambling code group and y is the frame timing.

TABLE 3

1. Calculate S-SCH correlation for each slot with each of the 16 SSCs.

$$R(i, j) = \left| \sum_{k=0}^{255} x_k^i c_k^j \right|^2 \quad j = 1, 2, \ldots, 16 \quad i = 1, 2, \ldots, N_{t2}$$

$x_k^i = k^{th}$ sample of $i^{th}$ slot $c_k^j =$ corresponding sample of $j^{th}$ SSC $N_{t2} =$ number of slots used for averaging correlations
If $N_{t2} > 15$ the correlations of the corresponding slots should be added together.

TABLE 3-continued

2.
$$D_y^x = \sum_{k=0}^{14} R((y+k) \bmod 15, c(x, k))$$

$\forall\ x = 0, 1, \ldots, 63$ $y = 0, 1, \ldots, 14$

R(i, j) = output of the correlator in slot i with SSC j
C(i, j) = code number used in slot i from group j 3. Determine which [x, y] maximizes $D_y^x$ x = scrambling code group
y = frame timing Another algorithm for determining frame timing and scrambling code group is known as coherent detection. In coherent detection, the P-SCH is used for deriving a channel estimate and this channel estimate is used to correct the phase of the S-SCH for combining. Steps 2 and 3 of coherent detection are the same as the non-coherent detection algorithm, described above.

Figure 4:
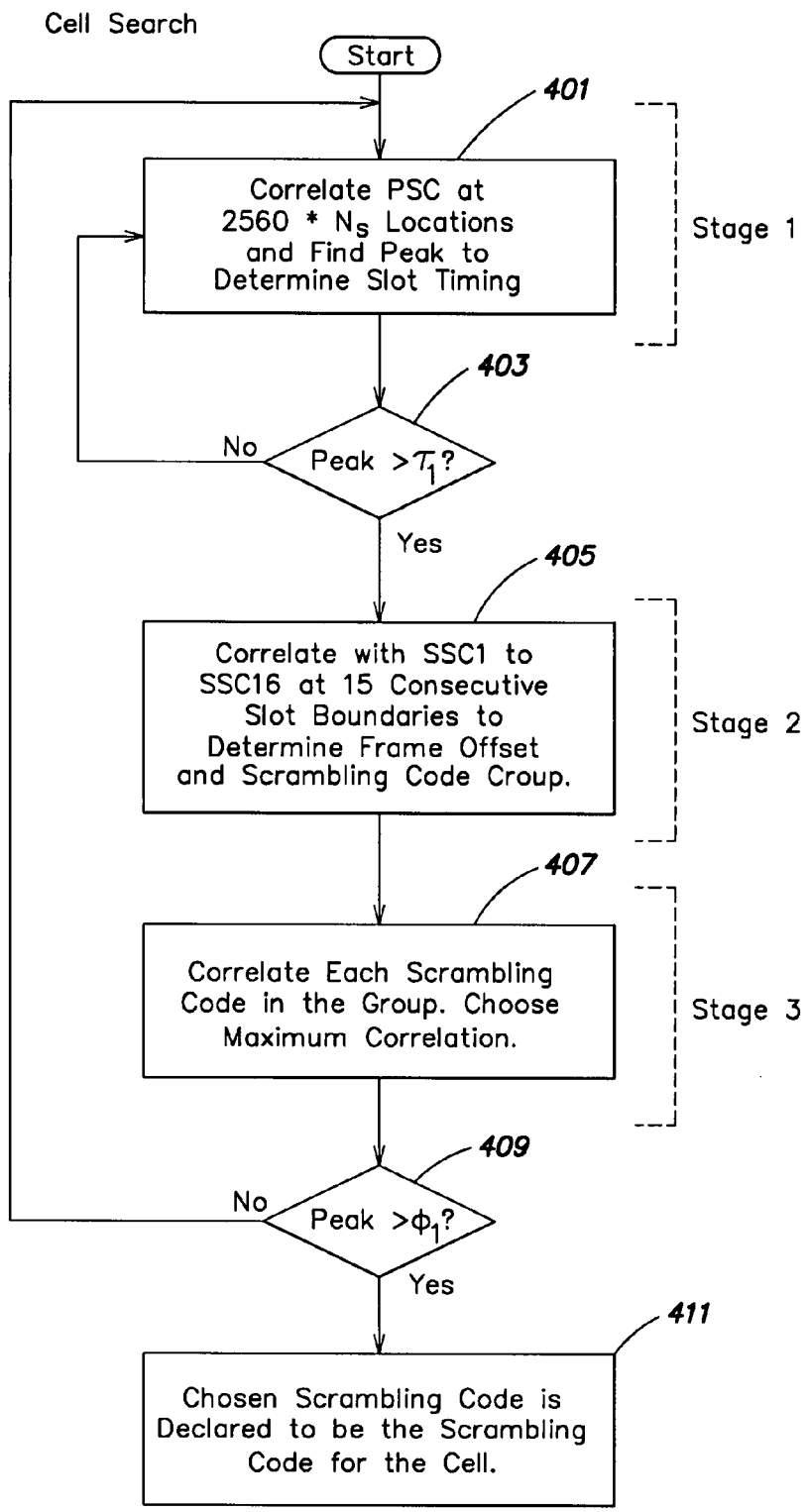
FIG. 4 is a flow chart illustrating an example of a method for performing cell search according to one embodiment of the invention.

The CPICH is spread with the primary scrambling code of the cell. Once the slot and frame timing have been determined, the correct scrambling code may be determined by correlating each scrambling code in the scrambling code group identified from the S-SCH with the received signal. The scrambling code with the highest correlation peak above a certain threshold may be selected as the scrambling code used in the cell. FIG. 4 illustrates an example of an algorithm for identifying the correct scrambling code. At step 401, stage 1 of cell search is performed and slot timing is determined using the primary synchronization code broadcast on the P-SCH. At step 403, if the maximum correlation calculated at step 401 exceeds a threshold, a1, then the process continues to determine frame timing and scrambling code group. If the maximum correlation does not exceed the threshold, stage 1 is repeated. At step 405, stage two of cell search is performed to determine frame timing and identify the scrambling code group. The received signal is correlated with sixteen SSCs using the slot timing from stage I to determine the frame offset and scrambling code group. At step 407, once the frame timing and the scrambling code group have been determined, stage three of cell search is performed. Each scrambling code in the scrambling code group is aligned in time with the received signal using the frame timing determined in step 405 and correlated. The maximum correlation value is selected and if it exceeds a threshold, $\phi_1$, (step 409), it is selected as the scrambling code for the cell (step 411).

As shown in FIG. 5A, the three stages of cell search can run concurrently, for is example, using parallel running hardware. The pipelined approach allows for decreased acquisition time, and because stage two and stage three can be resynchronized to the PSC at every slot, timing error can also be reduced. For example, if there is a failure at stage three (501), it is not necessary to wait to complete stage one and stage two again because these stages have already been performed at 503 and 507. Thus, it is possible to simply perform stage three (507) again using the slot timing from stage one (503) and the frame timing from stage 2 (505). Alternatively, sequential cell search illustrated in FIG. 5B can be used, in which each stage is performed sequentially, and not in parallel. For example, if there is a failure at stage three (551), then stage one (553) and stage two (555) must again be performed, before repeating stage three (557).

As described above, stage three involves correlating each scrambling code in the scrambling code group with the received signal and selecting the scrambling code corresponding to the maximum correlation value as the scrambling code for the cell if it exceeds a threshold.

The threshold $\phi_1$ may be a predetermined and fixed threshold. A predetermined and fixed threshold does not adjust itself based on the power of the signal. As a result, if a high threshold is chosen, a weak signal could result in none of the scrambling codes having a correlation value which exceeds the threshold causing a failure in stage three and a repetition of cell search even though the correct scrambling code group was chosen in stage two and the correct scrambling code had the highest correlation value. Using a threshold in this manner could result in many false negatives which results in increased cell search time and power consumption. Conversely, if a low threshold is chosen, the correlation values of even the incorrect chipping codes may exceed the threshold.

An error in stage 1 or stage 2 could result in incorrect frame timing and incorrect scrambling code group identification. In this case, a false positive could occur in stage three, wherein an incorrect scrambling code is selected as the scrambling code for the cell. The mobile station may attempt to use this scrambling code to communicate with the base station for a period of time before it can be determined that the scrambling code is incorrect. Even after it is determined that the scrambling code is incorrect, cell search must again be repeated. As a result, time and power can be wasted in trying to communicate with an incorrect scrambling code.

Figure 6:
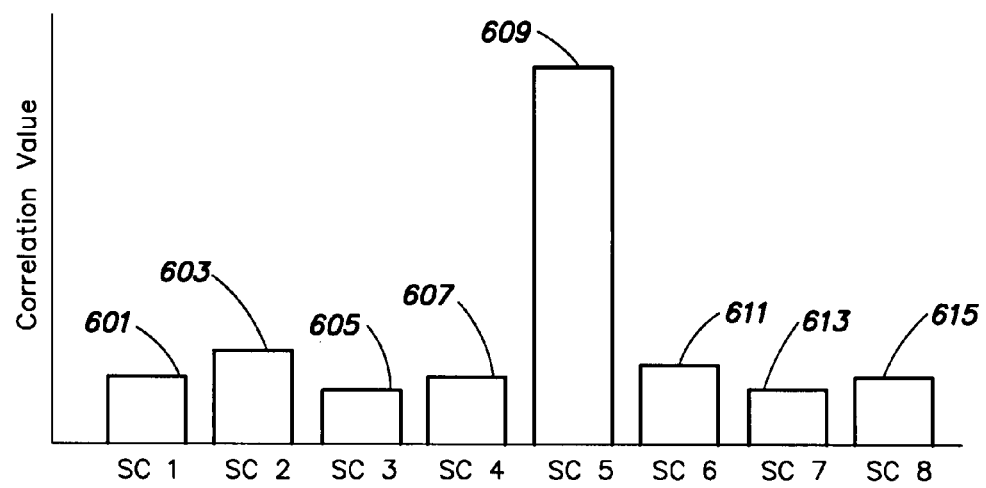
FIG. 6 is a diagram illustrating examples of correlation values for scrambling codes in a group in a WCDMA wireless system.

In WCDMA cellular systems, the scrambling codes are chosen to have low cross-correlation with the other scrambling codes and low auto-correlation properties with time-shifted versions of themselves. Because of the low cross-correlation between scrambling codes in a group, if the correct frame timing and scrambling code group are provided, then, in stage three it is expected that one scrambling code in the scrambling code group will have a very high correlation value with the received signal, while the rest of the scrambling codes in the scrambling code group will have much lower correlation values. An example is shown in FIG. 6. Scrambling codes one, two, three, etc., and eight have low correlation values (e.g., correlation values 601, 603, 605, and 615) while scrambling code five has a very high correlation value (e.g., correlation value 609). Thus, the ratio of scrambling code five to any of the other scrambling codes should be high, while the ratio between any of the other scrambling codes should be lower and close to one.

Figure 7:
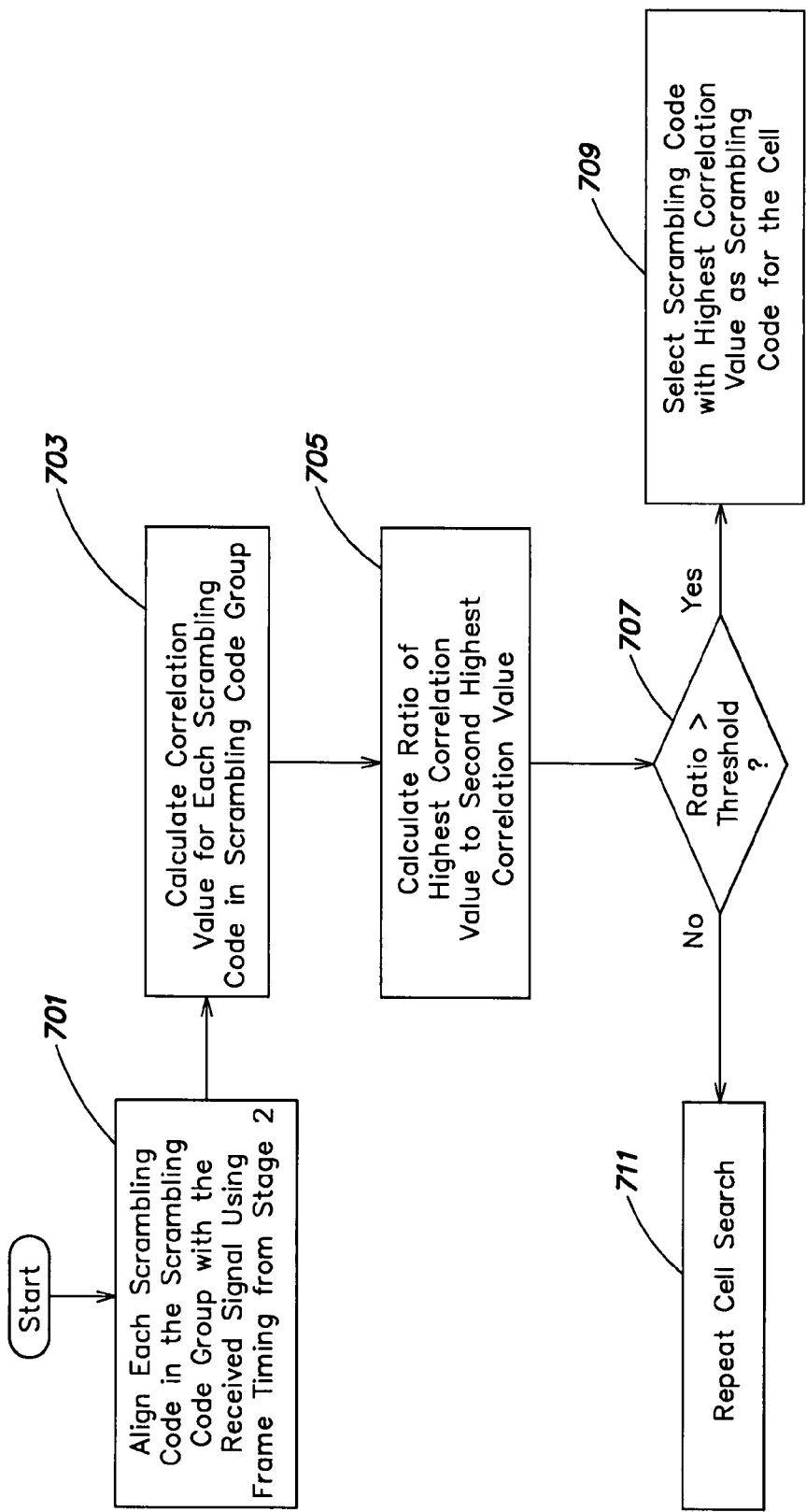
FIG. 7 is a flowchart illustrating an example of a method for performing stage three of cell search in a WCDMA wireless system according to one embodiment of the invention.

FIG. 7 shows another method for performing stage three of cell search. After frame timing and the scrambling code group are determined in stage two of cell search, at step 701, each scrambling code in the scrambling code group is aligned in time with the received signal based on the frame timing. Then, at step 703, the correlation value for each scrambling code in the scrambling code group is calculated. Next, at step 705, the ratio of the highest correlation value to the second highest correlation value is calculated. Table 4 shows an example of an equation for calculating this ratio. At step 707, the ratio is compared to a threshold. If the ratio is greater than the threshold, then at step 709 the scrambling code with the highest correlation value is selected as the scrambling code for the cell. If the ratio is not greater than the threshold, cell search is repeated at step 711. It may be noted that this algorithm for stage three of cell search also uses a threshold. However, this threshold is not dependent on the power of the signal because it is a threshold for a ratio of correlation values. If the power of the received signals will be low, all correlation values will be affected and the ratio between any two correlation values can remain approximately the same. The probability of false detection at stage three may also be reduced by using this algorithm because a positive detection results only from one scrambling code in a group having a high correlation value and the rest of the scrambling codes in the group having low correlation values.

TABLE 4

$$\chi = \frac{MAX([C_1, C_2, \ldots, C_8])}{SecondMAX([C_1, C_2, \ldots, C_8])}$$

$C_n$ = correlation value of scrambling code n

Figure 8:
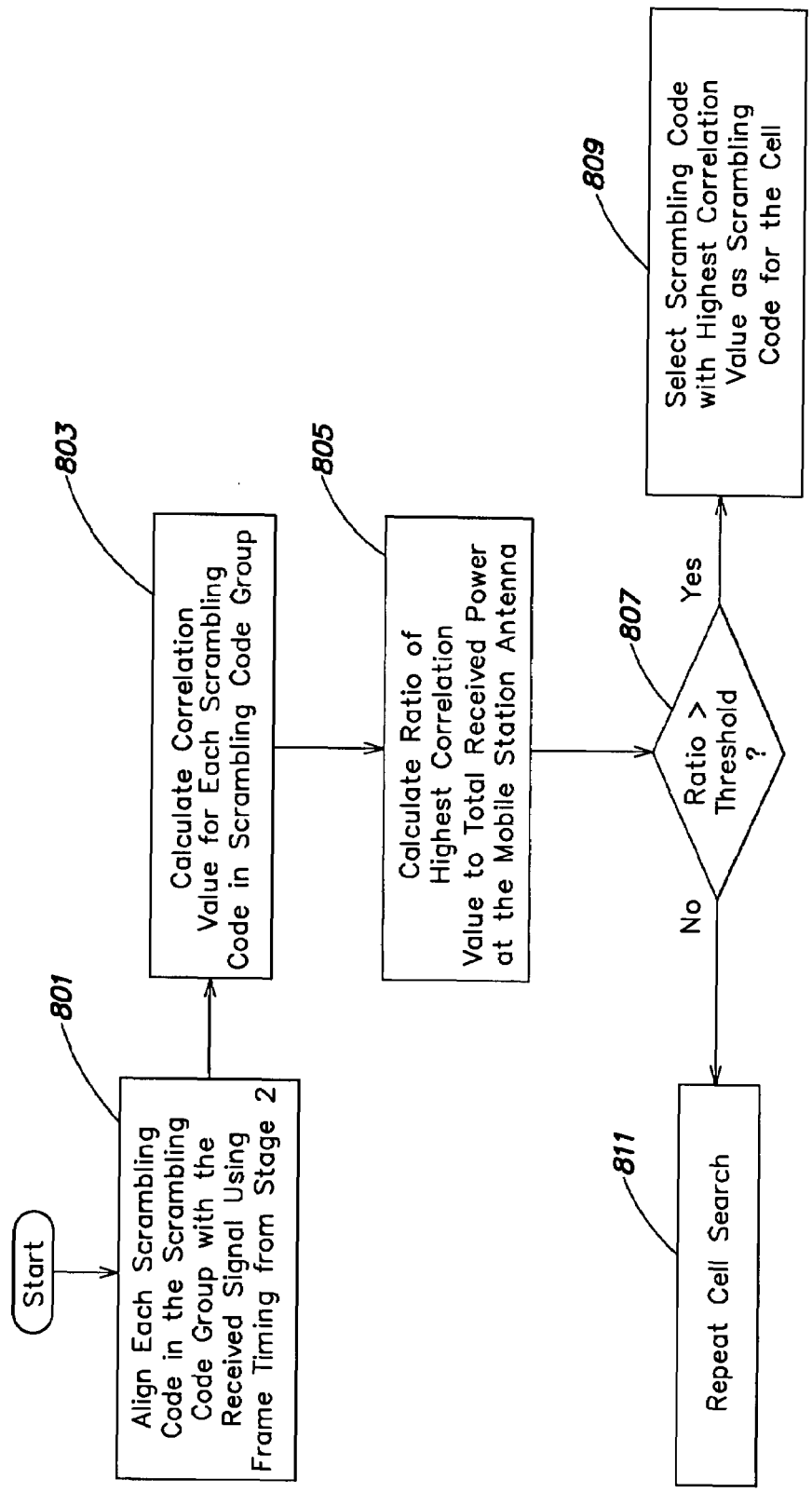
FIG. 8 is a flowchart illustrating an example of a method for performing stage three of cell search in a WCDMA wireless system according to one embodiment of the invention.

Another algorithm for stage three of cell search is illustrated in FIG. 8. In FIG. 8, at step 801, each scrambling code is aligned in time with the received signal using a provided frame timing. Then, at step 803, the correlation value for each scrambling code in the scrambling code group is calculated. Next, at step 805, the ratio of the highest correlation value to the total received power is calculated. The total received power may be calculated by using analog circuits or could be estimated at the output of an analog to digital converter. Many other methods of calculating the total received power could be used. Table 5 shows an equation for calculating this ratio. At step 807 the ratio is compared to a threshold. If the ratio exceeds this threshold, then at step 809 the scrambling code with the highest correlation value is selected as the scrambling code for the cell. Otherwise, cell search is repeated at step 811.

TABLE 5

$$\beta = \frac{MAX([C_1, C_2, \ldots, C_8])}{I_0}$$

$C_n$ = correlation value of scrambling code n
$I_0$ = Total received power.

Figure 9:
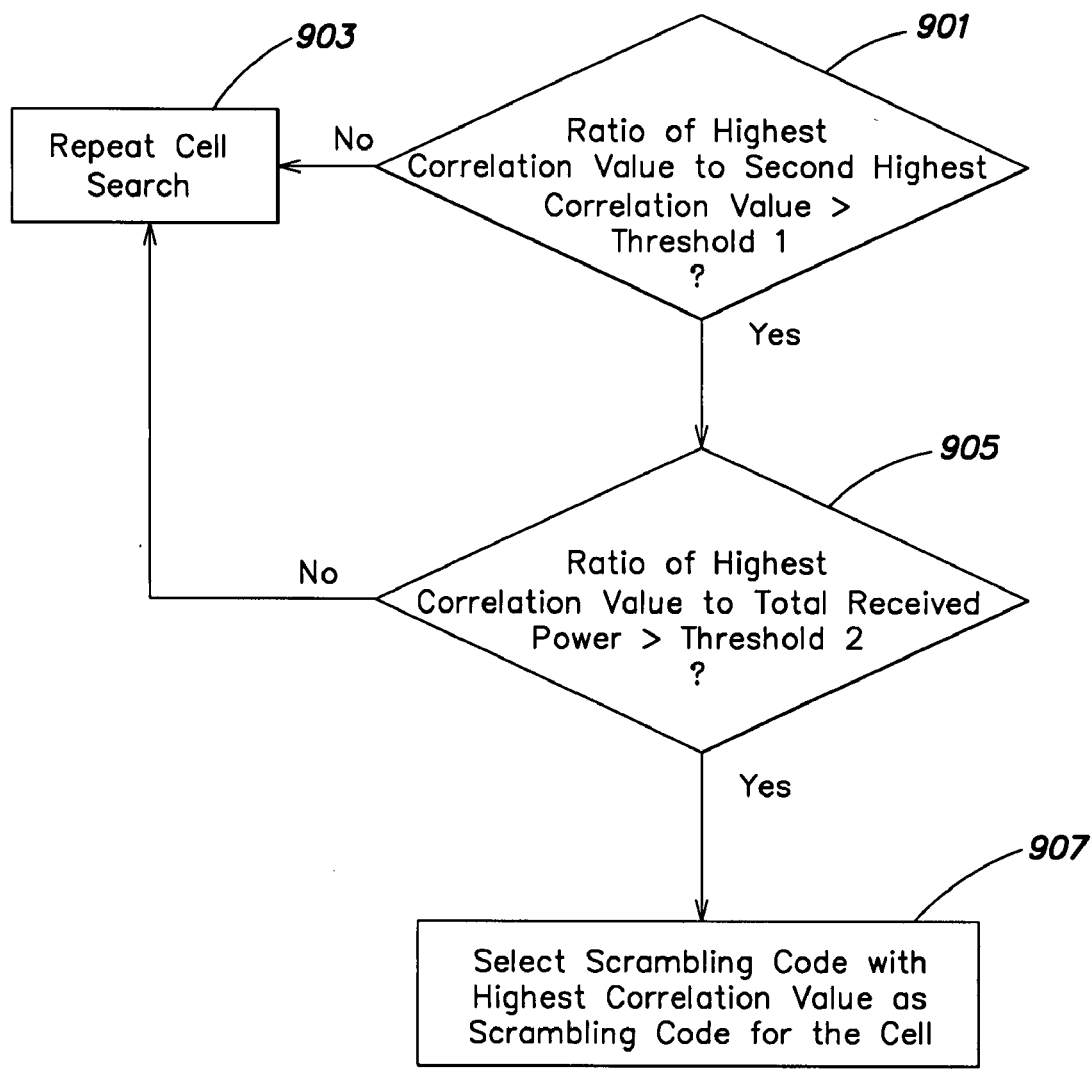
FIG. 9 is a flowchart illustrating an example method for performing stage three of cell search in a WCDMA wireless system in accordance with one embodiment of the invention.

The algorithms for stage three of cell search illustrated in FIG. 7 and FIG. 8 may be used independently or may be used in conjunction, as shown in FIG. 9. For example, if, at step 901, the ratio of the highest correlation value to the second highest exceeds a first threshold then the ratio of the highest correlation value to the total received power may be calculated before selecting a scrambling code for that cell. If the ratio is greater than a second threshold at step 905, then the scrambling code with the highest correlation value may be selected as a scrambling code for the cell (step 907), otherwise the process may be repeated (step 903). Thus, the ratio test of both algorithms must succeed for a scrambling code to be selected. Alternatively, step 905 could be performed as the first ratio test and step 901 may be performed as the second ratio test. When using these tests in conjunction, it may not be necessary to calculate the correlation values of each scrambling code twice.

The algorithms for stage three of cell search illustrated in FIGS. 7 and 8 partition the decision region into two sections. That is, as shown in Table 6, the output of the ratio calculation, $\chi$, indicates a correct detection of the scrambling code if it is greater than a threshold, $\phi_1$, and indicates an incorrect detection of the scrambling code if it is less than $\phi_1$. The decision region may also be partitioned into three or more sections as shown in Table 7. In a decision region with three sections, two thresholds, $\phi_1$ and $\phi_2$ are used. If the output of the ratio calculation, $\chi$, is greater than $\phi_1$, then the comparison indicates correct detection of the scrambling code. If $\chi$ is less than $\phi_2$, then incorrect detection of the scrambling code is indicated. If $\chi$ falls between $\phi_1$ and $\phi_2$, then the comparison indicates indecision. There may be several causes for indecision. For example, the received signal may be in deep fade during scrambling code identification, or timing is no longer accurate because of timing drift and timing error caused by crystal inaccuracy.

If $\chi$ falls in the indecision region, stage three of cell search may be performed as follows. A new search window centered around the provided frame timing can be defined, and the selected scrambling code may be correlated at each position inside this window. $\chi$ may then be recalculated for all positions inside the new search window, and if the maximum value of $\chi$ is greater than a threshold, the scrambling code with the highest correlation value may be selected as the scrambling code for the cell. By doing this, the impact of timing error is neutralized. In addition, the signal may be no longer in deep fade.

TABLE 6

$\chi \geq \phi_1$ => correct detection of scrambling code
$\chi < \phi_1$ => incorrect detection of scrambling code
$\chi$ = output of ratio calculation

TABLE 7

$\chi \geq \phi_1$ => correct detection of scrambling code
$\chi \leq \phi_2$ => incorrect detection of scrambling code
$\phi_2 < \chi < \Phi_1$ => indecision region
$\chi$ = output of ratio calculation The algorithms illustrated in FIG. 7 and FIG. 8 have been described in relation to stage three. However, these algorithms may also be applied to other stages of cell search. For example, the algorithm illustrated in FIG. 8 could be used in stage one of cell search. As described above, in stage one of cell search the PSC is correlated at 2560 locations. The ratio of the maximum correlation value of all these correlations to the total received power may be calculated and if this ratio exceeds a threshold, then the location with the highest correlation value may be selected as the slot boundary.

As shown in Table 8, these algorithms may also be applied to stage two of cell search. In this case, the decision variable, $D_y^x$, is calculated for each [x, y] as described above in relation to Table 3. If the ratio $\sigma$ calculated as the ratio of the maximum value of the decision variable divided by the second maximum value of the decision variable, exceeds a threshold, the value of [x, y] corresponding to $MAX[D_{hu\ x}]$ could be chosen as the code group and frame timing.

Likewise, the algorithm for stage three of cell search illustrated in FIG. 7 may also be applied to stage two of cell search.

TABLE 8

$$\sigma = \frac{MAX([D_y^x])}{SecondMAX([D_y^x])}$$

As show in Table 9, $\rho$ is calculated as the maximum value of the decision variable divided by the total power received at the mobile station antenna. If the ratio $\rho$ exceeds a threshold, the SSC with the highest correlation value may be selected as the correct SSC for that slot. It should be appreciated that the output of ratio calculation σ or ρ could be portioned into two or three decisions regions for taking decisions as illustrated in Table 6 and Table 7.

TABLE 9

$$\rho = \frac{MAX([D_y^x])}{I_0}$$

Another algorithm for determining the correct scrambling code uses the available information about transmission power of the CPICH relative to the PSCH or SSCH transmission power. The different stream of signals transmitted by a base-station traverses the same propagation channel to reach the mobile station and is similarly affected.

In the 3GPP WCDMA systems, every base station transmits PSCH, SSCH, as well as CPICH. The CPICH transmission power, relative to PSCH or SSCH power, is more or less known to the mobile station. The mobile station can predict the correlation value of the scrambling code used, based on PSC/SSC correlations and the power offset between PSCH/SSCH and CPICH. A threshold for scrambling code detection can be derived from the predicted correlation value.

After determining correct timing, for example from stage 1 and stage 2 of cell search, the received power on the PSCH and SSCH may already be determined. Then, the received signal may be correlated with each possible scrambling code in the correct scrambling code group. If the correlation of the received signal with a particular scrambling code exceeds the threshold obtained, the particular scrambling code may be chosen as the scrambling code for the base station.

The mobile station may use the above described algorithms in one of two search procedures. The first procedure is known as initial cell selection. Initial cell selection may be performed, for example, when the mobile station first turns on. In this procedure, no prior knowledge of which RF channels are appropriate WCDMA carriers is required. The second procedure is known as target cell search, or stored information cell selection. This procedure may be used by the mobile station, for example, when the mobile station is moving between cells. Stored information of carrier frequencies and cell parameters, such as scrambling codes, from previously received measurement control information elements may be used in the search. For example, in target cell search, the number of SSC code sequences that can be used by a target cell may be reduced based on received neighbor cell information. Thus, the computational complexity of target cell search may be less than that of initial cell search. However, the algorithms described above may be used in either of the two search procedures.

Having thus described various embodiments of the present invention, additional alterations, modifications and improvements will readily occur to those skilled in the art. Accordingly, the foregoing description is by way of example only, and not intended to be limiting. The invention is limited only as defined in the following claims and the equivalents thereto.

What is claimed is:

1. In a communications system, a method of determining whether a chipping code from a group of codes is used in a signal, the method comprising steps of:
   a) receiving a signal which uses a chipping code;
   b) calculating, for each respective code in the group of codes, a correlation value of the received signal and the respective code;
   c) comparing, responsive to the step b) of calculating, a highest correlation value and a next highest correlation value;
   d) determining if the comparison of step c) exceeds a first threshold;
   e) comparing the highest correlation value and a total received power of the signal;
   f) determining if the comparison of step e) exceeds a second threshold; and
   g) selecting the code with the highest correlation value as the correct code if the determination in d) exceeds the first threshold and the determination in f) exceeds the second threshold.

2. The method of claim 1, further comprising:
   determining correlation values of codes used by the transmitter;
   predicting a correlation value for the chipping code, based on the correlation values of the known codes and power offsets among the codes;
   deriving a threshold from the predicted correlation value; and
   comparing the highest correlation value using the threshold.

3. The method of claim 1, wherein the step e) further comprises:
   dividing the highest correlation value by the total received power of the signal.

4. The method of claim 1, wherein the step c) further comprises:
   dividing the highest correlation value by the next highest correlation value to produce a comparison value.

5. The method of claim 4, wherein step d) comprises determining if the comparison value exceeds the first threshold.

6. The method of claim 4, further comprising:
   repeating steps a)-d) if the comparison value is less than a third threshold.

7. The method of claim 4, further comprising:
   repeating the steps a)-d) using a reduced set of codes in the group of codes if the comparison value is in between the first threshold and a third threshold.

8. The method of claim 1, wherein the step a) further comprises:
   determining a slot timing and a frame timing of the signal.

9. In a communications system, apparatus for determining whether a chipping code from a group of codes is used in the received signal, the apparatus comprising:
   a) means for receiving a signal which uses a chipping code;
   b) means for calculating, for each respective chipping code in the group of chipping codes, a correlation value of the received signal and the respective chipping code;
   c) means for comparing, responsive to the act b) of calculating, a highest correlation value and a next highest correlation value;
   d) means for determining if the comparison of step c) exceeds a first threshold;
   e) means for comparing the highest correlation value and a total received power of the signal;
   f) means for determining if the comparison of step e) exceeds a second threshold; and
   g) means for selecting the chipping code with the highest correlation value as the correct chipping code based on steps d) and f).

10. The apparatus of claim 9, wherein the group of chipping codes includes 8 chipping codes.

11. The apparatus of claim 9, wherein the means for receiving the signal is part of a mobile station.

12. The apparatus of claim 9, further comprising:
means for determining correlation values of codes used by the transmitter;
means for predicting a correlation value for the chipping code, based on the correlation values of the known codes and power offsets among the codes;
means for deriving a threshold from the predicted correlation value; and
means for comparing the highest correlation value using the threshold derived in the step c).

13. In a wireless communications network having a base station which uses a corresponding chipping code to transmit data to a plurality of mobile stations the base station using the corresponding chipping code to spread the data before transmission, a method of selecting the corresponding chipping code from the group of chipping codes:
 a) transmitting a signal which includes the corresponding chipping code from the base station to a mobile station;
 b) using the mobile station to calculate, for each respective chipping code in the group of chipping codes, a correlation value of the signal and the respective chipping code;
 c) using the mobile station to compare, responsive to the step b), a highest correlation value and a next highest correlation value;
 d) using the mobile station to determine if the comparison of step c) exceeds a first threshold;
 e) using the mobile station to compare the highest correlation value and a total received power of the signal;
 f) using the mobile station to determine if the comparison of step e) exceeds a second threshold;
 g) using the mobile station to select the chipping code with the highest correlation value as the correct chipping code if the determination in d) exceeds the first threshold and the determination in f) exceeds the second threshold.

14. The method of claim 13, wherein the step e) further comprises:
using the mobile station to divide the highest correlation value by the total received power of the signal.

15. The method of claim 13, wherein the step c) further comprises:
using the mobile station to divide the highest correlation value by the next highest correlation value to produce a comparison value.

16. The method of claim 15, wherein step d) comprises using the mobile station to determine if the comparison value exceeds the first threshold.

17. The method of claim 15, further comprising:
repeating steps a)-d) if the comparison value is less than a third threshold.

18. The method of claim 15, further comprising:
repeating the steps a)-d) using a reduced set of chipping codes in the group of chipping codes if the comparison value is in between the first threshold and a third threshold.

19. The method of claim 13, wherein the step a) further comprises:
using the mobile station to determine a slot timing and a frame timing used by the base station to transmit the signal.

20. In a communication system, a method of determining whether a chipping code from a group of codes is used in a signal, the method comprising steps of:
 a) receiving a signal which uses a chipping code;
 b) calculating, for each respective chipping code in the group of chipping codes, a correlation value of the signal and the respective chipping code;
 c) comparing, responsive to the step b), a highest correlation value and a total received power of the signal;
 d) determining if the comparison of step c) exceeds a first threshold;
 e) comparing the highest correlation value and a next highest correlation value; and
 f) determining if the comparison of step e) exceeds a second threshold;
 g) selecting the chipping code with the highest correlation value as the correct chipping code if the determination in d) exceeds the first threshold and the determination in f) exceeds the second threshold.

21. The method of claim 20, wherein the step e) further comprises:
dividing the highest correlation value by the next highest correlation value.

22. The method of claim 20, wherein the step c) further comprises:
dividing the highest correlation value by the total received power of the signal to produce a comparison value.

23. The method of claim 22, wherein step d) comprises determining if the comparison value exceeds the first threshold.

24. The method of claim 22, further comprising:
repeating steps a)-d) if the comparison value is less than a third threshold.

25. The method of claim 22, further comprising:
repeating the steps a)-d) using a reduced set of chipping codes in the group of chipping codes if the comparison value is in between the first threshold and a third threshold.

26. The method of claim 20, wherein the step a) further comprises:
determining a slot timing and a frame timing used by the base station to transmit the signal.

27. The method of claim 20, further comprising:
determining correlation values of codes used by the transmitter;
predicting a correlation value for the chipping code, based on the correlation values of the known codes and power offsets among the codes;
deriving a threshold from the predicted correlation value; and
comparing the highest correlation value using the threshold.

28. In a wireless communications network having a base station which broadcasts data to a plurality of mobile stations according to a corresponding chipping code belonging to a group of chipping codes, the base station using its corresponding chipping code to divide the data before transmission, the base station broadcasting the chipping code in a radio frame having a plurality of slots, a method of selecting the corresponding chipping code from a group of chipping codes:
 a) using the mobile station to determine a slot timing a radio frame used in transmissions by the base station by determining a timing of a first signal broadcast at the beginning of each slot in the radio frame by the base station on a primary synchronization channel;

b) using the mobile station to determine a frame timing of a radio frame used in transmissions by the base station by determining a pattern of second signals broadcast by the base station at the beginning of each slot of the radio frame on a secondary synchronization channel;

c) determining the group of chipping codes based on the pattern;

d) transmitting a third signal from the base station to a mobile station according to the frame timing determined in step b);

e) using the mobile station to calculate, for each respective chipping code in the determined group of chipping codes, a correlation value of the signal and the respective chipping code;

f) using the mobile station to compare, responsive to the step e), a highest correlation value and a next highest correlation value;

g) using the mobile station to determine if the comparison of step f) exceeds a first threshold;

h) using the mobile station to compare the highest correlation value and a total received power of the signal;

i) using the mobile station to determine if the comparison of step h) exceeds a second threshold; and j) using the mobile station to select the code with the highest correlation value as the correct code if the determination in g) exceeds the first threshold and the determination in i) exceeds the second threshold.

29. In a communications system a method of determining whether a chipping code from a group of codes is used in a signal, the method comprising steps of:

a) determining correlation values of codes used by the transmitter;

b) predicting a correlation value for the chipping code, based on the correlation values of the known codes and power offsets among the codes;

c) deriving a threshold from the predicted correlation value;

d) comparing the highest correlation value using the threshold derived in the step c); and e) selecting the code with the highest correlation value as the correct code if the comparison in step d) indicates the highest correlation value exceeds the threshold.

* * * * *